United States
Fagan

[15] 3,699,327
[45] Oct. 17, 1972

[54] FILM VIEWER
[72] Inventor: James R. Fagan, Columbus, Ohio
[73] Assignee: North American Rockwell Corporation
[22] Filed: July 28, 1971
[21] Appl. No.: 166,850

[52] U.S. Cl. ................240/41.3, 350/190, 353/102, 240/106.1
[51] Int. Cl. ...............................................F21v 13/04
[58] Field of Search ......240/41, 41.3, 106.1; 353/98, 353/102; 350/190, 199

[56] References Cited

UNITED STATES PATENTS

| | | | |
|---|---|---|---|
| 3,529,117 | 9/1970 | Costello | 350/190 X |
| 2,505,528 | 4/1950 | Crane | 355/31 X |
| 3,598,989 | 8/1971 | Biggs | 240/41.3 |
| 3,179,898 | 4/1965 | Meltzer | 350/199 X |

FOREIGN PATENTS OR APPLICATIONS 941,160   11/1963   Great Britain.............353/102

Primary Examiner—Samuel S. Matthews
Assistant Examiner—Richard M. Sheer
Attorney—L. Lee Humphries et al.

[57] ABSTRACT

A film viewer having a radiation conversion and control device for improved image brightness and image resolution. The device comprises a elongated open sided reflector of elliptical cross-section having an elongated circular cylindrical collector lens adjacent the open side. An elongated diffuser area is position on the surface of the lens to spread the light issuing from the lens.

An iris diaphragm is positioned adjacent the collector lens for controling the amount of light passing to the film to be viewed.

4 Claims, 4 Drawing Figures

PATENTED OCT 17 1972 3,699,327

INVENTOR.
JAMES R. FAGAN
BY
ATTORNEY

FILM VIEWER

SUMMARY OF THE INVENTION

A film viewer assembly having a conventional zoom projector, mirror, and screen arrangement is provided with a novel illuminator assembly in combination with the viewer film gate and transport. The illuminator assembly makes use of a high-intensity linear arc lamp, an open face, closed end eliptical lamp reflector, and a cylindrical collector lens positioned to receive light at a focal line of the eliptical reflector. A mechanically-operated iris diaphragm is provided immediately adjacent the light-emitting surface of the cylindrical collector lens. The light admitted through the iris passes through a conventional condenser lens assembly, through the film (and film transport), and into the zoom projector for display on the apparatus screen.

DETAILED DESCRIPTION

Figure 1:
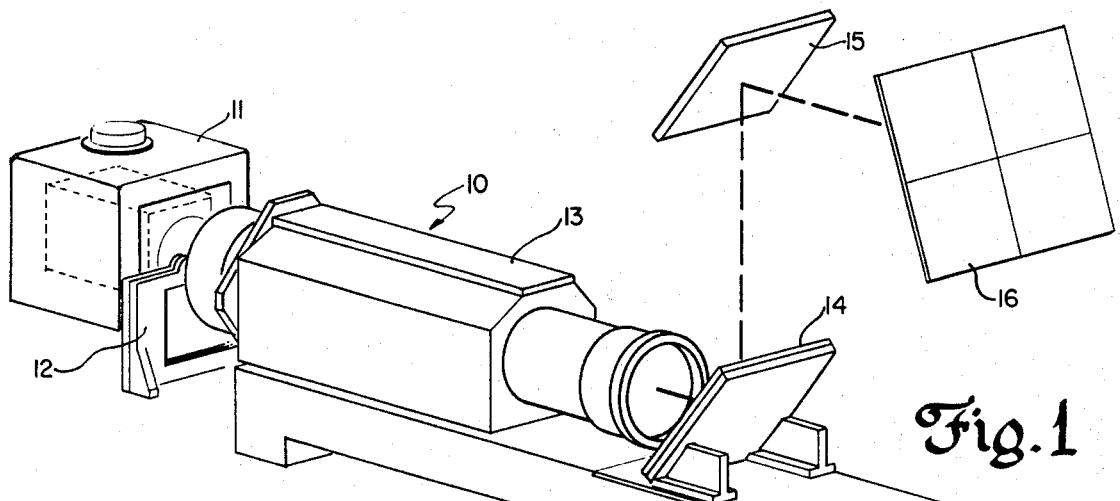
FIG. 1 is a perspective view of a film viewer assembly having the features of this invention.
Figure 3:
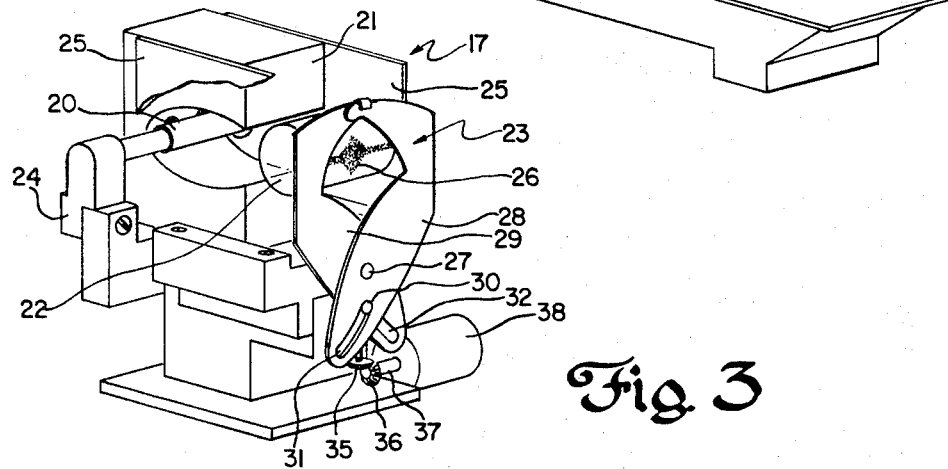
FIG. 3 is a perspective view of the radiation converter and iris assembly employed in the viewer of FIGS. 1 and 2.
Figure 2:
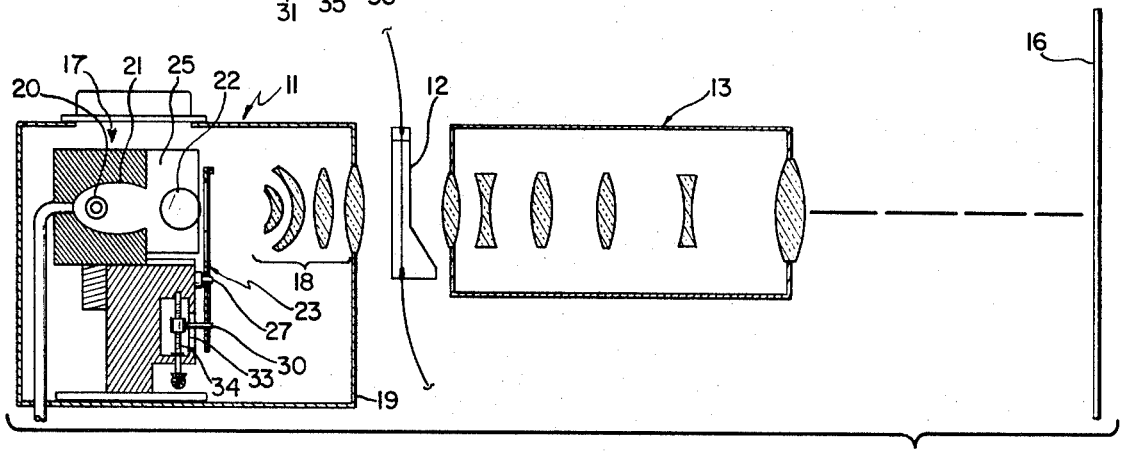
FIG. 2 is a sectional view through the FIG. 1 assembly.
Figure 4:
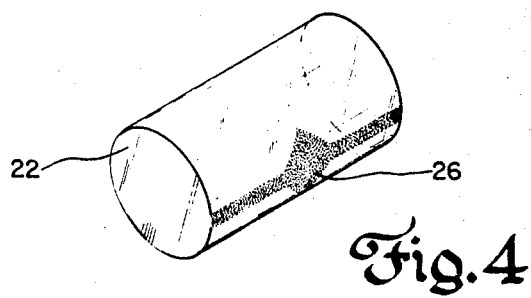
FIG. 4 is a perspective view of the cylindrical collector lens and diffuser means utilized in the invention.

FIG. 1 illustrates a film viewer 10 in accordance with this invention. As shown therein, film viewer 10 is essentially comprised of illuminator assembly 11, a film gate and transport 12, zoom projector assembly 13, and mirrors 14, 15 for displaying the image projected by assembly 13 on viewing screen 16. In the sectional view of FIG. 2, illuminator 11 is shown as being essentially comprised of a converter/iris assembly (17, FIG. 3) with light source and a condenser lens assembly 18, both positioned within housing 19. The important features of this invention principally involve the converter/iris assembly, and details regarding the preferred construction of that assembly are provided in FIG. 3.

The important elements of assembly 17 are the illustrated high-intensity, high-pressure mercury arc lamp 20, reflector 21 having an eliptical cross-section, and cylindrical collector lens 22, and the iris diaphragm referenced as 23. Linear lamp 20 is located at a focal line of eliptical reflector 21 and is normally connected to a source of electrical energy through supports such as 24. Lens 22 is located in assembly 17 so that the face portion most adjacent to reflector 21 is located essentially along the other reflector focal line. Mirrors 25 close the ends of the reflector assembly. Lens 22 is provided with a diffuse area 26, formed as by surface etching. The diffuse surface 26 causes spreading of the light rays issuing from this point of the lens so as to fill the complete aperture of the condenser lens assembly optics 18 at the lower light levels. As greater light energy is required from the radiation converter, the iris diaphragm 23 is opened to extend beyond the extent of diffuse area 26, allowing the more direct radiation from this portion of the collector lens to enter condenser lens assembly 18. The purpose of this arrangement is to allow full film gate width and height illumination at the lower light levels normally required when the viewer is operated at low magnifications. When greater light energy is required from the radiation converter, as is the case when greater magnifications are used in the viewer, the more direct rays of light passing through the iris from around the areas adjacent to the diffuse area 26 causes the increased brightness to be placed only in the area of the film gate under observation. By this technique the increased light energy utilization afforded by the reflector/collector lens arrangement is further improved by the conservation of energy.

Iris diaphragm 23 is pivotally supported on the base of assembly 17 at pivot point 27 and its separate leaves 28, 29 are moved simultaneously about the pivot 27 during operation by cooperation between vertically-moved pin 30 positioned within slots 31, 32 in leaves 28, 29 respectively. Pin 30 projects through a slot 33 in the illuminator base (see FIG. 2) and is moved vertically by cooperation with worm gear 34. Worm gear 34 is rotated through the illustrated cooperating bevel gears 35, 36 with bevel gear 36 being mounted on the end of the shaft 37 of selectively reversible drive motor 38. Conventional means for controlling direction and degree of movement of motor 38 are normally utilized but are not shown in the drawings.

Eliptical reflector 21 collects omni-directional radiation from lamp 20 and the flat mirrors 25 placed at the otherwise open ends of reflector 21 make the lamp/mirror combination appear to be of infinite length. By virtue of the fact that the lamp is surrounded by either the reflecting surfaces of reflector 21 or the refracting surfaces of collector 22, virtually all radiation from radiation source 20 is usefully collected. By varying the position of the collector lens 22 in relation to the lamp/reflector, the optical dispersion of the light from the converter assembly can be varied to suit the optical characteristics of the condenser assembly/film projector lens combination. By way of example, a viewer having the features of this invention was determined to provide a viewing screen intensity of five to eight times the intensity obtained with a conventional condenser/lamp assembly.

The improved brightness control achieved in the practice of the invention is developed with constant color temperature, thereby overcoming disadvantages associated with viewers in which the light source intensity is varied electrically as by voltage or current adjustments. Optimum dimming control is achieved in the practice of the instant invention by locating the iris diaphragm 23 at the focal plane of condenser lens assembly 18. Such achieves both maximum light transfer and maximum chromatic correction.

I claim:

1. In an optical film viewer having a film viewing position, in combination:
   a. an elongated open sided reflector of elliptical cross section,
   b. a linear, high-intensity mercury arc lamp mounted in said reflector with its longitudinal axis parallel to the central longitudinal axis of said reflector and containing the focus of a cross-section of said reflector remote from the open side of said reflector, c. an elongated circularly cylindrical collector lens positioned so that its longitudinal axis lies in the plane containing the longitudinal axis and both foci of a cross-section of said reflector and so that the line defined by the intersection of said plane and the surface of said lens nearer the longitudinal axis of said reflector contains the focus of a cross-section of said reflector nearer the open side of said reflector for receiving radiation from said lamp and emitting said radiation substantially uniformly from and over an elongated semi-cylindrical surface portion, and d. an iris diaphragm which passes light emitted by said collector lens elongated semi-cylindrical surface portion for utilization in viewing a film at the film viewing position, said iris diaphragm being positioned adjacent said collector lens and intermediate the open side of said reflector and the viewing position.

2. The invention defined by claim 1, wherein said iris diaphragm has an aperture which may be opened to a maximum area, and wherein said collector lens has an inset emitting surface diffuser area in said light-emitting semi-cylindrical surface portion, said iris diaphragm aperture and maximum area being aligned with and of substantially greater extent than said collector lens inset emitting surface diffuser area.

3. The invention defined by claim 2, wherein said collector lens inset emitting surface diffuser area is provided with an elongated extension at opposite sides, said diffuser area extensions being elongated and essentially parallel to and co-extensive with said linear mercury arc lamp.

4. The invention defined by claim 1, wherein the film viewer is provided with a condenser lens, said condenser lens being aligned with and positioned intermediate iris diaphragm and said film viewing position.

* * * * *